United States Patent [19]

Selbeck et al.

[11] Patent Number: 4,978,743

[45] Date of Patent: Dec. 18, 1990

[54] PROCESS FOR THE CONTINUOUS, COUNTER FLOW/DIRECT FLOW EXTRACTION OF POLYAMIDES

[75] Inventors: Harald Selbeck; August Horsthemke; August Böckmann, all of Krefeld; Frank Weber, Duisburg, all of Fed. Rep. of Germany

[73] Assignee: Bayer Aktiengesellschaft, Leverkusen, Fed. Rep. of Germany

[21] Appl. No.: 246,361

[22] Filed: Sep. 19, 1988

[30] Foreign Application Priority Data

Sep. 24, 1987 [DE] Fed. Rep. of Germany ....... 3732170

[51] Int. Cl.$^5$ .............................................. C08G 69/46
[52] U.S. Cl. .................................... 528/499; 422/129; 528/323; 528/495; 528/496
[58] Field of Search ................. 528/499, 495, 496, 323

[56] References Cited

U.S. PATENT DOCUMENTS 3,905,946 9/1975 Nieswandt et al. ................. 528/499

Primary Examiner—Harold D. Anderson
Attorney, Agent, or Firm—Connolly and Hutz

[57] ABSTRACT

This invention relates to a process for the continuous extraction of polyamides, in which the residue of low molecular weight components left in the polyamide is very small. It also relates to a two-part extraction tube suitable for this purpose, in which the upper part is connected to the lower part by a transition tube of smaller diameter and a counterflow extraction is carried out in the upper part and a direct flow extraction in the lower part under particular conditions.

9 Claims, 1 Drawing Sheet

PROCESS FOR THE CONTINUOUS, COUNTER FLOW/DIRECT FLOW EXTRACTION OF POLYAMIDES

This invention relates to a process for the continuous extraction of polyamides in which the amount of low molecular weight components left in the polyamide is very slight. It also relates to a two-part extraction tube suitable for this process, in which the upper part and the lower part are connected by a transition tube of smaller diameter and counterflow extraction is carried out in the upper part and direct flow extraction in the lower part under certain conditions.

Polyamides in some cases still contain considerable quantities of starting monomers, oligomers or low molecular weight condensation products after polymerisation. Since these low molecular weight components in most cases deleteriously affect the use of the polyamide, they must be removed from the polymer. Polycaprolactam (Polyamide 6), for example, still contains about 10% of ε-caprolactam, and about 0.5% of dimeric caprolactam and higher oligomers (trimers, tetramers, etc.) after polymerisation.

Various continuous processes described in the Patent literature are intended to result in extensive and uniform extraction of the monomeric ε-caprolactam and the oligomers from Polyamide 6. Most of these processes employ counterflow extraction with hot water and the polyamide, which is usually in a granular form, is introduced into an extraction tube from the top and the extraction water is introduced from below. The extracted granulate is removed from the extraction tube at the bottom and dried or after-condensed to higher molecular weights in subsequent apparatus. The extraction water containing ε-caprolactam and oligomers is removed from the extraction tube at the top. After removal of the water by distillation, ε-caprolactam and oligomers are recovered and optionally worked up to isolate the ε-caprolactam or directly returned to polymerisation.

According to the literature, good extraction of the low molecular weight components can be achieved if the rate of throughput of solvent is very high. In that case, however, the monomers and oligomers are obtained in a highly diluted state so that recovery is expensive.

It would therefore be desirable to use as little water as possible for extraction so that the extraction process can be carried out economically. Since, however, the concentration of lactam and hence the density of the extraction water in the extraction tube increase towards the top, water rich in lactam is liable to produce a downwardly directed counterflow which seriously reduces the efficiency of extraction. The Patent literature contains numerous publications which deal with the problem of preventing this counterflow.

DE-AS No. 1 209 293 describes a counterflow extraction process in which the water introduced from the bottom is removed from the extraction tube at various levels. A small quantity of high percentage lactam solution is obtained at the top end of the extraction tube and a larger quantity of a more dilute lactam solution is removed at a lower level. The larger quantity of more dilute solution in the lower part of the extraction tube is said to improve the extraction yield. The process is, however, problematic since the high lactam concentration in the upper part of the extraction tube increases the density of the extraction water to such an extent that this extraction water is liable to flow down into the zones of water with lower lactum content, thereby reducing the extraction output. Another disadvantage is that the lactam solution removed at the lower point must be distilled for recovery of the ε-caprolactam so that no economic advantage is obtained. DE-AS No. 1 209 293 also describes that extraction may be carried out at a temperature above the boiling point of the extraction medium, i.e. under pressure. In that case, the granulate must be introduced into the extraction tube through a pressure inlet. Such a process is technically complicated and therefore not to be recommended.

DE-AS No. 1 519 936 describes a counterflow extraction process in which the upward flow of the extraction water is improved compared with the counterflow by means of installations distributed along the height of the extraction tube. A process of this type also has the disadvantage of being technically complicated and dead spaces in which the granulate particles are liable to remain longer than desired and so be damaged may develop in the installations. The figures given for the extraction output are not convincing. 0.5% by weight of monomers are left in the granulate.

It is an object of the present invention to provide a continuous extraction process by which the low molecular weight components can be economically removed to such an extent that the product obtained will satisfy the highest requirements. Although various continuous processes described in the literature are perfectly capable of extracting the polyamides sufficiently for uncritical applications, the degree of extraction obtained with the known processes is not sufficient for specialized applications. An uncritical application would be, for example, the processing of polyamide to produce injection moulded parts which are not expected to satisfy any particular requirements. A critical application would be the use of the product for spinning purposes and its processing to form films and sheets. Manufacturers of films and sheeting are required, for example to produce a Polyamide 6 with an extremely low concentration of residual dimers since higher dimer contents may give rise to the formation of deposits on the rollers and therefore interfere with processing. A technically high grade Polyamide 6 for processing into films and sheeting should have a residual dimer content of less than 0.05%, preferably less than 0.03%. Such a product can then be processed trouble-free in sheeting plants for prolonged periods. The counterflow extraction processes described in the literature are overtaxed when attempts are made to produce a high lactam concentration in the water extraction discharged and a low residual dimer content. If the extraction tube is operated with a small quantity of water so that a high lactam concentration is obtained, then the concentration of dimers and oligomers in the water also increases. Extraction of the dimers from the polyamide in the upper zone which is rich in lactam therefore becomes difficult. In the lower zone, where the concentration of lactams and oligomers is lower due to the incoming extraction water, the dimer content can no longer be reduced to the required values of below 0.05%.

The present invention relates to a process for the continuous extraction of low molecular weight components from polyamides, in particular from poly-ε-caprolactam, by means of extraction liquids and the use of an extraction tube, characterised in that in a two-part extraction tube in which the two parts are connected by a transition tube of smaller diameter, counterflow extraction is carried out in the upper part of the extraction tube and direct flow extraction in the lower part of the extraction tube. For this purpose, the extraction liquid which is introduced into the upper part of the two-part extraction tube at a point just above the transition tube is carried partly upwards and partly downwards and extraction liquid is removed both at the upper end and at the lower end of the extraction tube, and the poly-ε-caprolactam flows through the two-part extraction tube from above downwards.

The upper part of the extraction tube is operated at temperatures below the boiling point of the extraction liquid while the lower part is selectively operated at temperatures below or above the boiling point of the extracting agent under normal pressure If particularly effective extraction is required, in particular as regards the residual dimer content in the poly-ε-caprolactam, then the lower part of the extraction tube is preferably operated at temperatures above the boiling point of the extracting agent under normal pressure (the extracting agent being under the hydrostatic pressure of the extraction column).

Water is in most cases used as extraction liquid as it is inexpensive and easy to handle but other extracting agents are also suitable, e.g. low molecular weight monohydric alcohols.

When water is used as extraction medium, temperatures from 80° to 100° C., preferably from 85° to 99° C., are employed in the upper part of the extraction tube while the lower part of the extraction tube is operated at 80° to 150° C., preferably at 110° to 135° C.

A particular advantage of the process according to the invention is that in the lower part of the extraction tube, extraction can be carried out at temperatures above the boiling point of the extracting agent under normal pressure without the need for a technically complicated pressure inlet. In order that this may be achieved, the upper part of the extraction tube must be sufficiently long so that the static liquid pressure produced by the liquid column in the upper part of the tube is sufficient to prevent boiling in the lower part of the extraction tube. Since the extraction liquid in the lower part of the extraction tube flows through the transition tube in direct current to the polyamide, a highly efficient temperature barrier is produced so that the temperature profile in the upper part of the extraction tube will not be affected even if the lower part of the extraction tube is operated at temperatures above the boiling point of the extracting agent under normal pressure.

The diameter of the transition tube is preferably from 5 to 50%, most preferably from 10 to 25% of the diameter of the extraction tube.

Another advantage of the process according to the invention is that the stream of extraction liquid carried into the lower part of the extraction tube may be used again without having to be worked up by distillation, thereby providing an economic advantage. The reason for this is that extraction is achieved to such a degree in the upper part of the extraction tube alone that the polyamide is suitable for uncritical application. Extraction in the lower part of the extraction tube consists mainly of residual extraction of the oligomers, so that the extraction water contains only small concentrations of ε-caprolactam and oligomers. This partial stream of the extraction liquid may be used for other purposes or it may be partly or completely used again for extraction.

Due to the effective residual extraction in the lower part of the extraction tube, the upward stream of extraction liquid may be kept so small that a high concentration of caprolactam is obtained in the solution discharged at the top. The costs for evaporation to recover the caprolactam are therefore low. The lactam concentrations are preferably adjusted to 2 to 25%, most preferably to 3 to 15%. The extraction liquid flowing in direct current with the polyamide preferably amounts to 0.5 to 10 times, most preferably 1 to 5 times the quantity of polyamide put through per unit time.

The process according to the invention enables the dimer content in the polyamide 6 to be lowered to residual contents of less than 0.05%. A high quality material suitable for processing into films and sheeting and for spinning purposes is thus obtained.

The invention also relates to an extraction tube suitable for the process.

BRIEF DESCRIPTION OF THE DRAWINGS

The arrangement according to the invention is illustrated in FIG. 1 which is described below.

The extraction liquid (1) flows from below into the upper part (2) of the two-part extraction tube. Polyamide (3) (for example, polyamide-ε-caprolactum) is introduced in granular form from the top. Part of the extraction liquid is removed from the top of the upper part of the extraction tube as solution (4) containing caprolactam and is worked up by distillation for recovery of the caprolactam. The remaining part of the extraction liquid (1) introduced is passed through the transition tube (5) into the lower part (6) of the two-part extraction tube and removed at the connecting point (7). The extracted material (9) is removed from the extraction tube by means of a discharge device (8) and worked up.

EXAMPLE 1

(Comparison Example)

Figure 1:
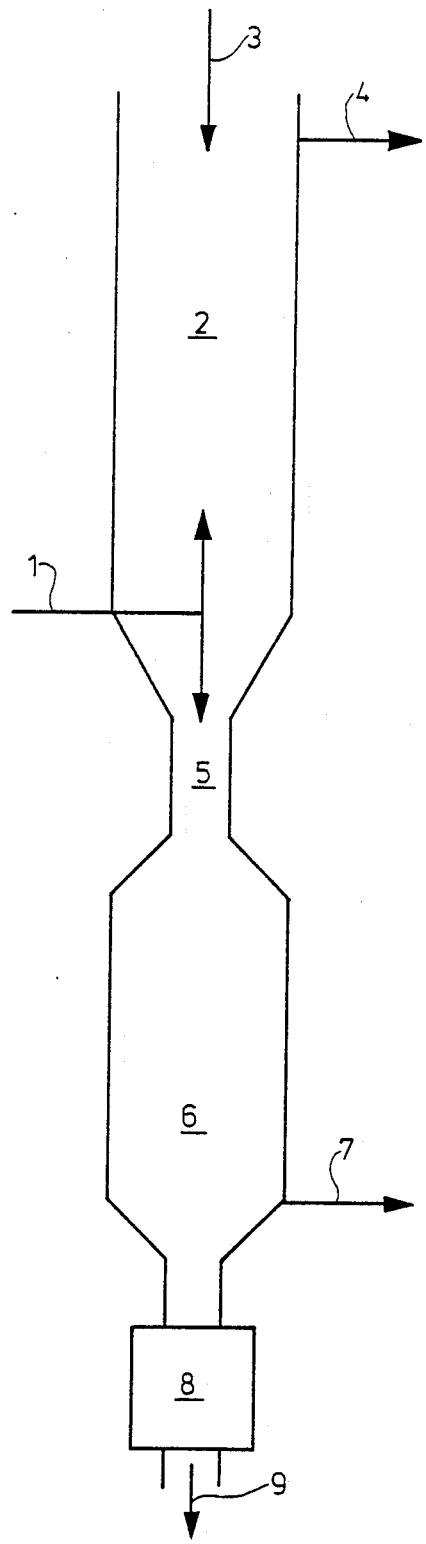

200 kg/h of unextracted poly-ε-caprolactam are continuously introduced into the top of an extraction tube 13 m in length and 1 m in diameter. The Polyamide-6 has a residue lactam content of 9.5% and a dimer content of 0.5% 250 l/h of water are at the same time introduced into the extraction tube from below at a temperature of 85° to 90° C. The extraction tube has a heating jacket which is adjusted so that the extraction water is discharged at the top at a temperature of 95° to 99° C. The lactam concentration in the water discharged is 7% and the residual dimer content in the extracted Polyamide-6 granulate is 0.08%.

EXAMPLE 2

500 kg/h of unextracted poly-ε-caprolactam are continuously introduced into a vertical, two-part extraction tube from the top. The polyamide has a residual lactam content of 9.5% and a dimer content of 0.5%. The extraction tube has the following construction:

| Upper part | length | 17 m |
|---|---|---|
| | diameter | 1.3 m |
| Transition tube | length | 2 m |
| | diameter | 0.2 m |
| Lower part | length | 6 m |
| | diameter | 1.3 m |

2 m³/h Water at a temperature of 85° to 90° C. are introduced at the lower end of the upper part of the extraction tube. 600 l/h are removed at the top end of the upper part of the extraction tube. The lactum content in the extraction water is 7.2%.

The upper part of the extraction tube is heated so that the temperature of the extraction water discharged is about 95° to 99° C.

1.4 m³/h of water are introduced into the lower part of the extraction tube through the transition tube in direct current of the polyamide granulate. The temperature in the lower part is 125° C. (under the hydrostatic pressure of the contents of the extraction column).

The extracted polyamide granulate has a dimer content of 0.02%. The extraction water leaving the lower part of the extraction tube has a lactam content of only 0.05%.

We claim:

1. Process for the continuous extraction of low molecular weight components from polycaprolactam by means of aqueous extraction liquid, which comprises
    adding the polycaprolactam in granular form to the top of a two-part extraction tube in which the upper part is connected to the lower part by a transition tube of smaller diameter, the diameter of the transition tube being 5–50% of the diameter of the extraction tube, wherein counterflow extraction is carried out in the upper part below the boiling point of water and concurrent flow extraction is carried out in the lower part, by means of the entire extraction water being introduced at the lower end of the upper part of the extraction tube and a part stream of this liquid being carried upwards while the other part stream is carried downwards through the transition tube into the lower part of the extraction tube, wherein the concurrent extraction in the lower part of the extraction tube is at temperatures above the boiling point of water at normal pressure, and the concurrent extraction is under the hydrostatic pressure of the extraction column with the amount of extraction fluid flowing concurrently with the polycaprolactam being 0.5 to 10 times the quantity passing through said lower part per unit time,
    removing extraction fluid at both the upper end and the lower end of the extraction tube and removing polycaprolactam from the bottom of the lower part of the extraction tube whereby the polycaprolactam removed contains less than 0.05% of dimer.

2. Process according to claim 1, in which, in the case of the extraction of poly-ε-caprolactam, the extraction water discharged from the upper part of the extraction tube contains virtually the whole quantity of the ε-caprolactam to be extracted and the water of extraction removed from the lower part of the extraction tube contains only small quantities of ε-caprolactam.

3. Process according to claim 1, in which the water of extraction removed from the lower part of the extraction tube is recycled as extraction liquid without being worked up by distillation.

4. Process according to claim 1 wherein the temperature in the upper part of the extraction tube is 85° to 99° C.

5. Process according to claim 1 wherein the temperature in the lower part of the extraction tube is 110° to 135° C.

6. Process according to claim 1 wherein the amount of extraction liquid flowing into the lower part of the extraction tube is 1 to 5 times the quantity of polycaprolactam per unit time.

7. Process according to claim 1 wherein the extracted poly-ε-caprolactam contains less than 0.03% dimer.

8. Process according to claim 1 wherein the transition tube is 10 to 25% of the diameter of the extraction tube.

9. Process according to claim 1 wherein the amount of aqueous extraction liquid is adjusted so that the portion removed at the upper end of the extraction tube contains 2 to 25% of extracted caprolactam.

* * * * *